UNITED STATES PATENT OFFICE.

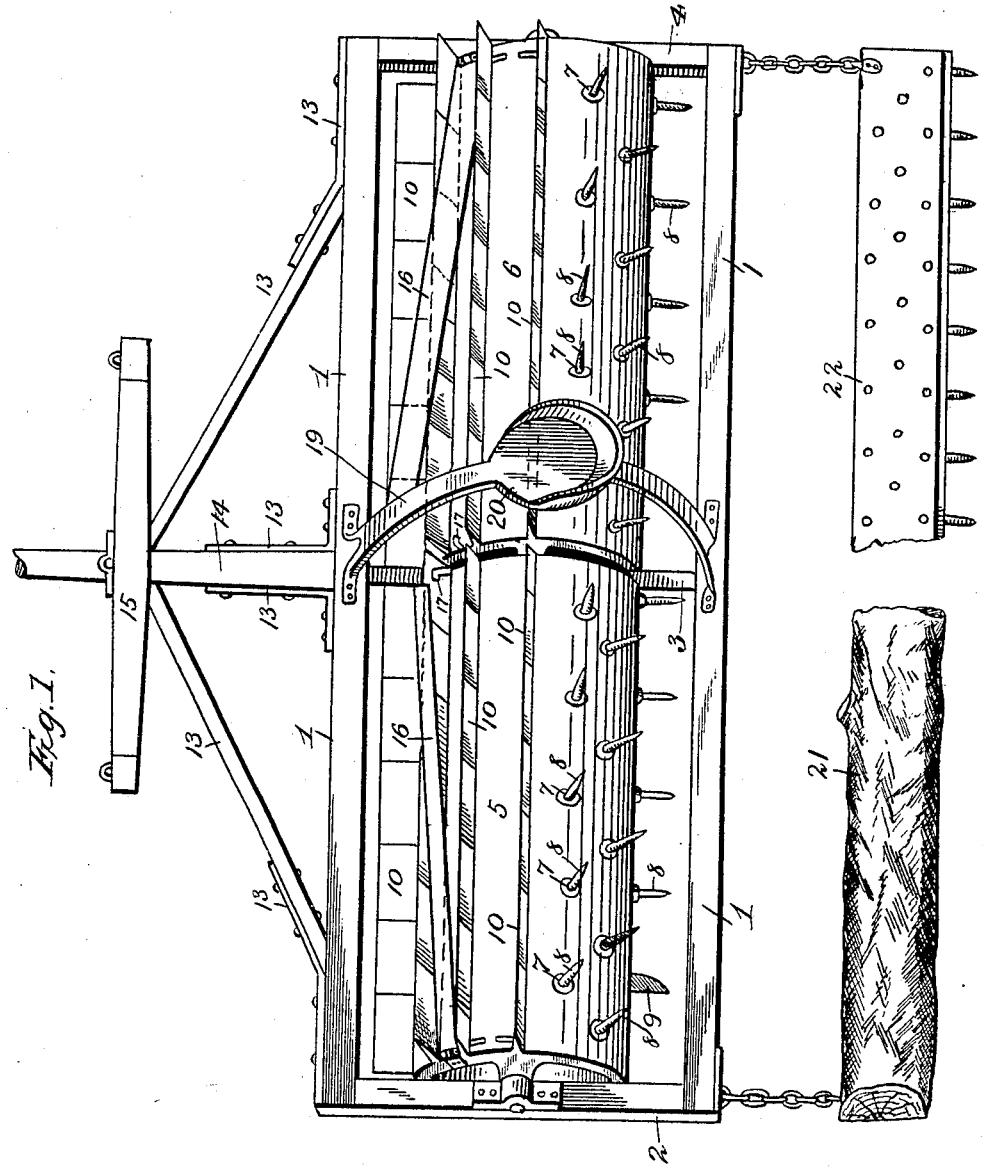

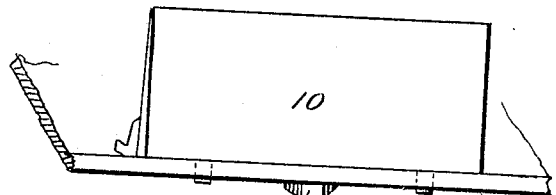
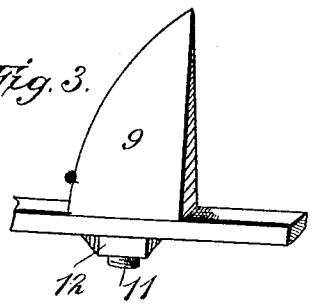
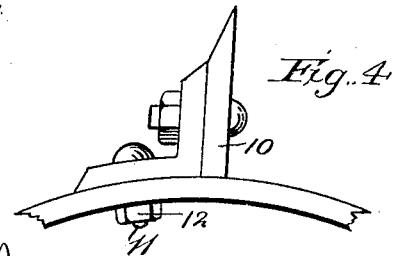
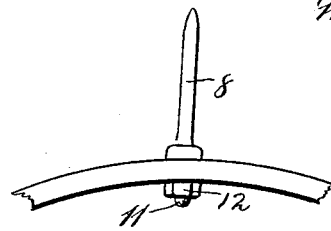
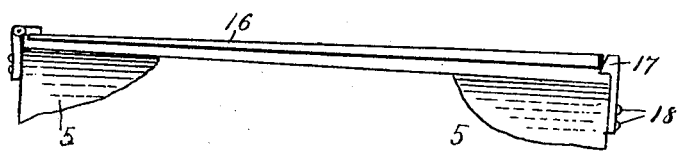

RICHARD H. POWELL, OF BATESVILLE, ARKANSAS.

COMBINATION FARMING IMPLEMENT.

No. 910,149.  Specification of Letters Patent.  Patented Jan. 19, 1909.

Application filed April 2, 1908. Serial No. 424,813.

To all whom it may concern:

Be it known that I, RICHARD H. POWELL, a citizen of the United States, residing at Batesville, in the county of Independence and State of Arkansas, have invented certain new and useful Improvements in Combination Farming Implements, of which the following is a specification.

My invention has relation to farming implements, and to those particular kinds known as clod mashers, harrows, turf-cutters, and stalk cutters, described in the following specification and illustrated in the accompanying drawings, which form a part thereof.

My invention has for its object to provide an implement for use on farms, that will be a time saver and will be of the greatest possible utility. That this may be done I have invented an implement that may be used or substituted for many different implements, thus saving considerable expense and inconvenience, together with time.

With these and other objects in view, my invention consists of the novel construction and arrangement of parts as are hereinafter described and illustrated and particularly pointed out in the claims, hereunto appended.

Reference being had to the drawings:— Figure 1, is a perspective view of my farming implement. Fig. 2, is a side elevational view of the knife blade used as an attachment for stalk cutting. Fig. 3, is a perspective view of the disk blade used for turf cutting. Fig. 4, is an edge view of said stalk cutting attachment. Fig. 5, is a front view of one of the harrow teeth used for an attachment for clod breaking. Fig. 6, is an edge view of the cleaning attachment used on my improved cultivator.

Referring more particularly to the drawings the frame 1, has pivotally mounted between the cross pieces 2 and 3, and 3 and 4, respectively, rollers 5 and 6. Passing through the walls of said rollers are perforations 7, through which are passed the lower ends of the harrow teeth 8, or of the disk blades 9. The knife blade 10, has a downwardly projecting extension 11, from its lower edge adapted to have screwed thereon a nut 12, said extension adapted to project through said hole 7, and secured in place by said nut 12. The lower ends of said disk blade and harrow tooth are also threaded, and adapted to be secured to the periphery of said rollers as above described. Secured to the front face of said frame 1, by means of braces 13, is a forwardly extending draft pole 14, having pivoted on the upper face thereof a double tree 15, for draft appliance.

It is obvious that the entire set of harrow teeth may be removed from the rollers, and in lieu thereof the knife blades, or disk blades substituted. When the implement is being used as a stalk cutter the knife blades are so arranged on the surface of said rollers that they form a series of longitudinal knives extending the entire length of said rollers. In wet land, and especially in black land the soil will stick to and clog up the space between these said knife blades, and prevent it from doing good work, and for the prevention of this I have invented an attachment whereby the mud or soil may be removed whenever desired. Pivoted to the outer edge of said rollers between each two series of stalk cutting knife blades is a slab 16, (shown clearly in Fig. 6), which may be raised outwardly whenever said slab is disengaged from the spring catch 17, which is secured to the inner ends of said rollers by means of nut and bolt connections 18, or any other substantial or well-known means.

It is pointed out that by having the roller in sections, as shown, it is much easier to make short turns, as, while turning, one section rolls forward, while the other turns rearwardly.

The harrow teeth are especially adapted for breaking clods, as without them, when the clods are hard the cylinder will only mash them into the earth, not breaking them; the disk blades are adapted for land that is tufty, while as described, the knife blades are for stalk cutting purposes, mainly, but may be used, to till the soil. It is obvious however that all three of these attachments may be used at the same time to facilitate matters.

Secured to the front and rear beam of said frame 1, by means of a suitable supporting frame 19, is a seat 20. Connected to the rear beam of said frame by means of a chain, or any other well known means, is a drag log 21, or harrow 22.

Though I have specifically described my invention I may claim the right to make such alterations, or modifications as do not depart from the spirit of my claims, and as fall within the scope of my invention.

Having described my invention what I claim as new and desire to secure by Letters Patent is:—

1. In a device of the character described a frame, divided into two sections, having rollers pivotally mounted thereon, means to draw said device, means to provide a substantial seat for the operator; said rollers having passing through their walls perforations, means for tilling the soil provided with downwardly extending projections, said projections passing through said perforations and secured therein by means of nuts, said extensions being threaded for the reception of said nuts; cleaning devices comprising slabs pivotally mounted on said rollers at their outer ends, and means to hold said slabs against the surface of said rollers, substantially as shown and described.

2. In a device of the character specified having a frame divided into two sections, rollers pivotally mounted between the cross pieces of said frame; said rollers provided with holes passing through their walls; means for stalk cutting and for tilling the soil, provided with extensions, said extensions passing through said holes in said rollers and means to hold them securely in place; means for cleaning said rollers comprising a slab adapted to be held against the surface of said rollers, substantially as shown and described.

3. In a combination clod masher, harrow, turf cutter and stalk cutting machine, comprising rollers pivotally mounted to a frame; a series of knives secured to the surface of said rollers, and means to clean said rollers and said knives, consisting of slabs pivotally mounted at the outer end of said rollers, said slabs being held in position by means of a spring catch secured to the inner ends of said rollers by nut and bolt connection; said rollers adapted to receive substitute attachments for clod breaking and turf cutting in lieu of said knives, substantially as shown and described.

In testimony whereof I affix my signature, in presence of two witnesses.

RICHARD H. POWELL.

Witnesses:
M. C. WEAVER,
A. W. DU PREE.